No. 895,646. PATENTED AUG. 11, 1908.
B. B. LADD.
BONDING CLAMP.
APPLICATION FILED JAN. 7, 1908.
2 SHEETS—SHEET 1.
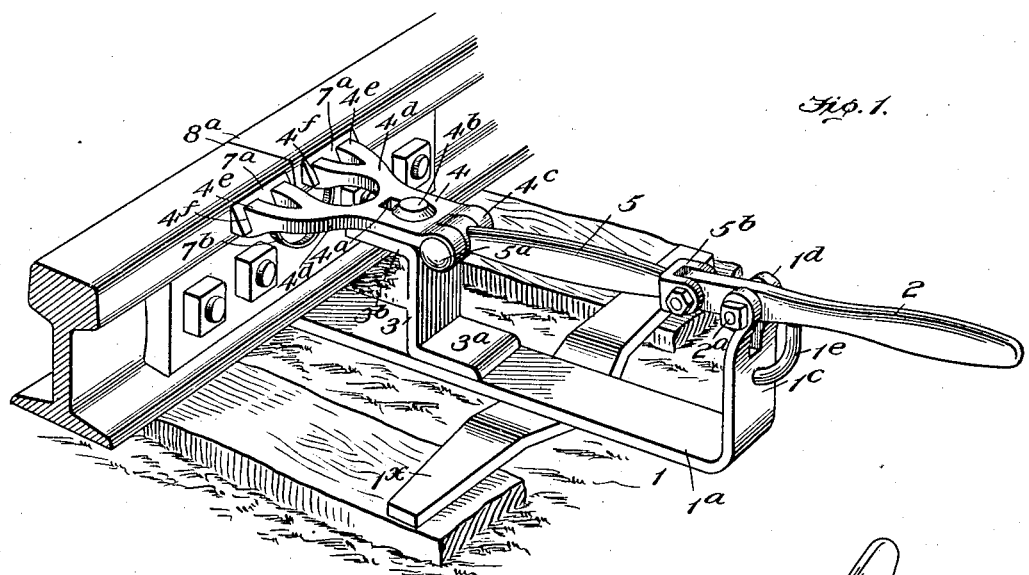
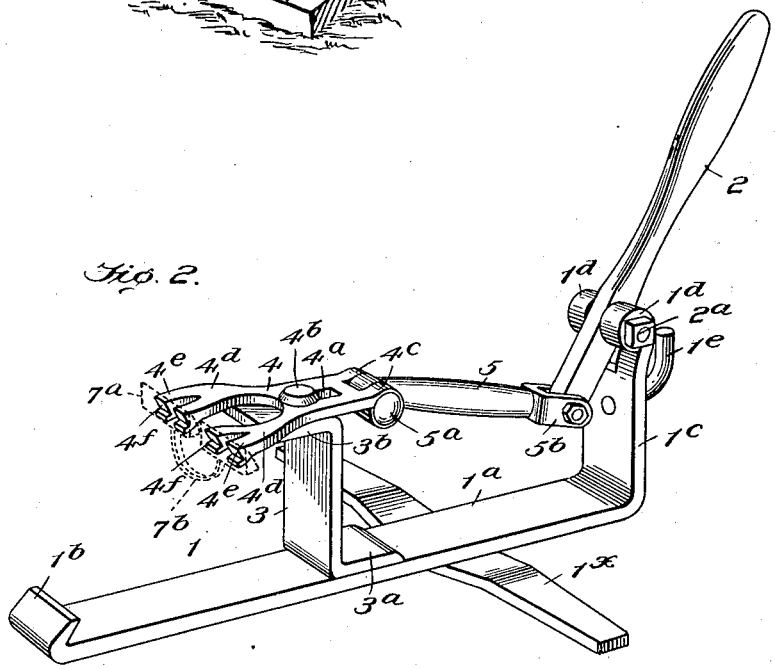
Witnesses
Edwin L. Bradford
John T. Schrott
Inventor
Burlington B. Ladd.
By Fred G. Dieterich & Co
Attorneys.

No. 895,646.
PATENTED AUG. 11, 1908.
B. B. LADD.
BONDING CLAMP.
APPLICATION FILED JAN. 7, 1908.
2 SHEETS—SHEET 2.
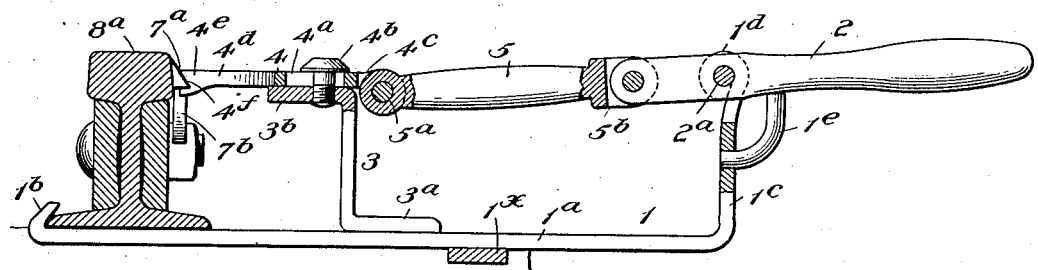
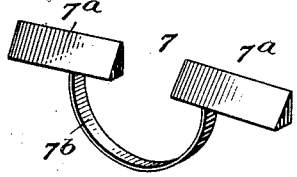
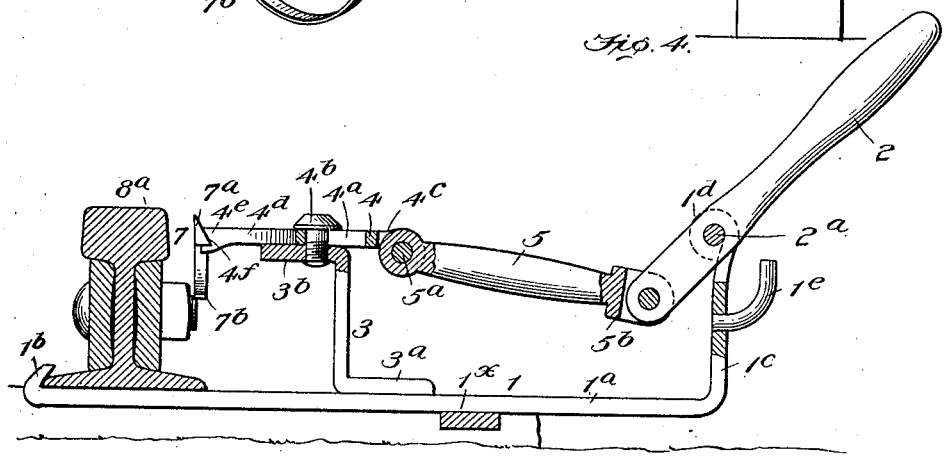
Witnesses
Edwin L. Bradford
John T. Schrott
Inventor
Burlington B. Ladd.
By Fred G. Dieterich & Co.
Attorneys.

UNITED STATES PATENT OFFICE.

BURLINGTON B. LADD, OF TUALITIN, OREGON, ASSIGNOR OF ONE-HALF TO JAMES G. THOMPSON, OF TUALITIN, OREGON.

BONDING-CLAMP.

No. 895,646.   Specification of Letters Patent.   Patented Aug. 11, 1908.

Application filed January 7, 1908. Serial No. 409,624.

*To all whom it may concern:*

Be it known that I, BURLINGTON B. LADD, residing at Tualitin, in the county of Washington and State of Oregon, have invented certain new and useful Improvements in Bonding-Clamps, of which the following is a specification.

My invention relates to certain new and useful improvements in bonding clamps and the like, and it primarily seeks to provide a clamp for holding the bond to the rail while soldering or welding the same onto the rail ends, the parts being so constructed as to not interfere with the passage of a train along the rail while the clamp is in place.

In its generic nature, the invention embodies a support having a member to straddle adjacent ties, and a portion to pass under and hook over the rail flange. The support also carries a slidable member having fingers that carry the bond and means for forcing the slidable member toward or from the rail, as conditions may require to hold the bond in place while being secured to the rail ends and to release the clamp therefrom when the sliding member is moved away from the rail.

Other details of construction which will first be described and then be specifically pointed out in the appended claims also comprise my invention.

In the drawings,—Figure 1, is a perspective view showing the application of my invention. Fig. 2, is a perspective view of my improved clamp removed from the rail. Fig. 3, is a central, vertical longitudinal section thereof the parts being in the position shown in Fig. 1. Fig. 4, is a similar view showing the slidable member withdrawn from engagement with the rail. Fig. 5, is a detail perspective view of the bond in connection with which my machine is particularly adapted for use. Fig. 6, is a detail elevation of the bonding clamp in place on the bifurcated ends of the sliding member 4.

Referring now to the accompanying drawings, in which like numerals and letters of reference indicate like parts in all of the figures, 1 represents the support which consists of the horizontal base $1^a$, whose end $1^b$ is turned up to form a rail base engaging hook member and whose opposite end $1^c$ is bent up at right angles to the base $1^a$ and terminates in spaced bearing portions $1^d$—$1^d$ between which the operating lever 2 is fulcrumed on a bolt $2^a$, as indicated.

$1^e$ designates a stop formed on the vertical support portion $1^c$ to coöperate with the lever 2 and limit its movement in one direction.

3 designates a bracket member secured to the base portion $1^a$ of the support by a web $3^a$ that may be soldered or otherwise secured to the base and the support 3 also includes a portion $3^b$ parallel with the base $1^a$ upon which portion $3^b$ the sliding member 4 is mounted.

The sliding member 4 has an elongated slot $4^a$ through which the securing pin $4^b$ passes to secure the member 4 onto the plate portion $3^b$ of the bracket 3. The sliding member 4 at its rear end is formed with spaced lugs $4^c$ between which the link 5 is fulcrumed on a bolt $5^a$, the link 5 having its other end $5^b$ bifurcated and pivotally connected with the lever 2, as indicated. The sliding member 4 is provided with a pair of forked arms $4^d$—$4^d$ which terminate in bifurcated portions forming fingers $4^e$—$4^e$, the front portions, *i. e.*, those adjacent the rail, being formed with notched recesses $4^f$ of a shape to receive heads $7^a$ of the bonding clamp 7.

The bonding clamp 7 which my invention is adapted to hold in place, consists of two heads $7^a$ connected by a copper strip $7^b$ of more or less resiliency, the heads $7^a$ being adapted to be soldered or welded to the rail ends $8^a$—$8^a$. The strip $7^b$ is adapted to grip the adjacent fingers $4^e$ and thus aid in holding the bond to the fingers of the sliding member as it is being fed to the rail and prevent the bond dropping off after once being placed in the fingers.

$1^\times$ designates a straddle bar secured to the base $1^a$ that is adapted to straddle over adjacent ties, and rest upon the same so as to support the base 1 between the ties and permit the hook end of the base to hook over the rail flanges.

In the practical operation of bonding rails the bond 7 must be held against the rail until soldered or welded thereto, as the case may be, and in order to securely hold the bond against the rail some sort of clamp must be used.

My invention provides a clamp of a very desirable construction for the reason that the bond may be held on the rail without interfering with the traffic as the train can pass across the rail ends without encountering my clamp and without necessitating the removal thereof during the passage of the train.

The bond is placed in the fingers of the sliding member while in the position shown in Fig. 4, and the lever 2 is then forced into a horizontal position, as shown in Fig. 1, thereby forcing the bond against the rails and tightly clamping the same thereto. The lever may be left in this position until the bond has been secured to the rail, after which the lever 2 can be moved upwardly and the sliding member withdrawn from the bond, after which the entire apparatus can be unhooked from the rail.

In practice the bond 7 is formed with its member $7^b$ of resilient material so that when the heads $7^a$ are slightly separated the bond may be slipped into position on the bifurcated end of the sliding member 4, so that the member $7^b$ will grip or clasp, as it were, the inner pair of fingers $4^e$ and hold the bond on the member 4, see Fig. 6, the gripping action taking place in the direction of the arrows in Fig. 6.

From the foregoing description taken in connection with the accompanying drawings, it is thought the complete construction, operation and advantages of my invention will be readily understood by those skilled in the art to which the invention appertains.

What I claim is:—

1. A clamp comprising a base portion having a hooked portion to engage the rail flange, means for supporting the base between adjacent ties, a bracket member secured to the base, a slidable member mounted on the bracket member and having bond carrying fingers, and means for forcing the sliding member in one direction to hold the bond against the rail.

2. A clamp comprising a base portion having a hooked portion to engage the rail flange, means for supporting the base between adjacent ties, a bracket member secured to the base, a slidable member mounted on the bracket member and having bond carrying fingers, means for forcing the sliding member in one direction to hold the bond against the rail, said last named means comprising a lever fulcrumed to a part of said support and coöperatively connected with said sliding member.

3. As a new article of manufacture, a rail bond clamp comprising a support having means for engaging the rail flange, means for sustaining said support between adjacent ties, a slidable member mounted on said support, said slidable member having bond engaging portions, and means for forcing said sliding member to hold the bond against a rail.

4. As a new article of manufacture, a rail bond clamp comprising a support having means for engaging the rail flange, means for sustaining said support between adjacent ties, a slidable member mounted on said support, said slidable member having bond engaging portions, means for forcing said sliding member to hold the bond against a rail, said sliding member comprising a body having a pair of arms terminating in bifurcated portions forming fingers, said fingers having their bond carrying faces formed to receive the bond heads.

BURLINGTON B. LADD.

Witnesses:
J. R. C. THOMPSON,
L. J. FRANCIS.